May 30, 1967 R. C. ROLLAND 3,322,448
STRUCTURAL ELEMENT AND JOINING MEANS THEREFOR
Filed May 12, 1964
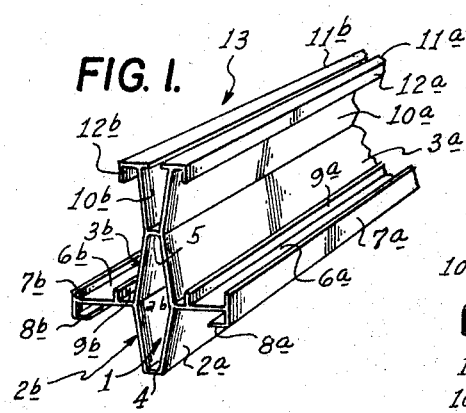
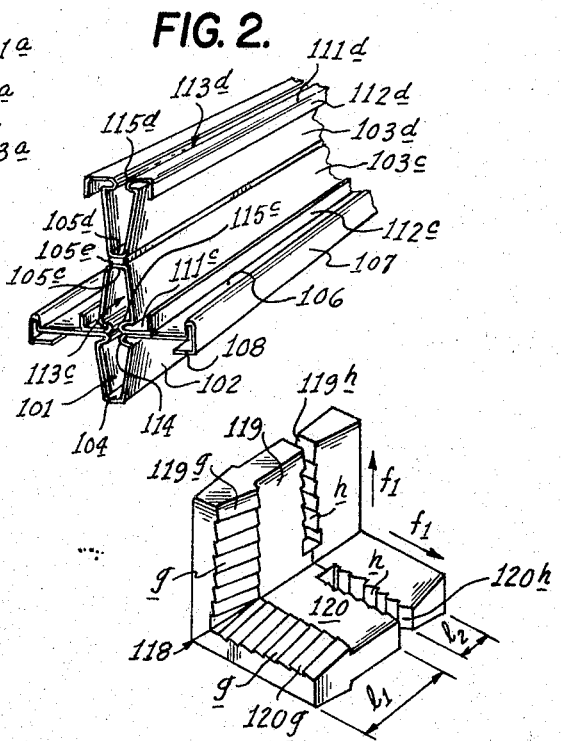
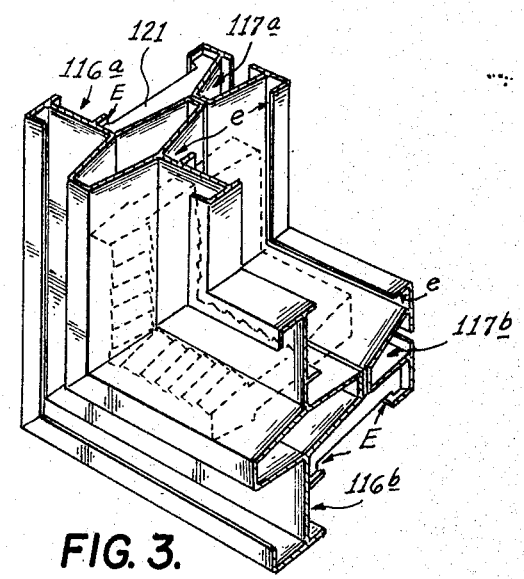
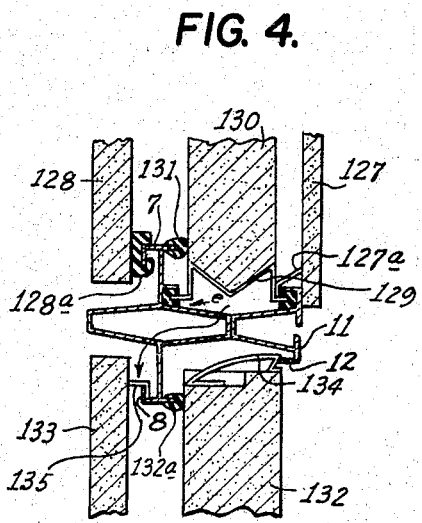
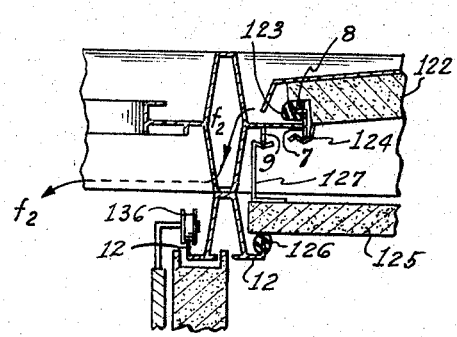
INVENTOR.
ROBERT C. ROLLAND
BY
ATTORNEY United States Patent Office 3,322,448
Patented May 30, 1967

3,322,448
STRUCTURAL ELEMENT AND JOINING
MEANS THEREFOR
Robert C. Rolland, 7 Place Stanislas,
Cannes, France
Filed May 12, 1964, Ser. No. 366,791
Claims priority, application Great Britain, May 14, 1963,
18,953/63
5 Claims. (Cl. 287—189.36)

This invention relates to an improved structural element of recessed sectional character, especially useful in prefabricated building work to assemble structural frames or panels, adapted after assembly to be fitted with various components of equipment such as slabs, cover panels and the like.

In the construction of buildings from prefabricated parts, various types of recessed sectional structural elements have been used and various joining means have been provided for assembling them into frames. The joining means employed have sometimes included joining members having legs insertable into the recesses of the structural elements to be joined, and formed on their engaging surfaces with serrations or rack-teeth shaped to oppose withdrawal of the joining members from out of the recesses of the elements into which they are inserted. However, the structural elements and associated joining means heretofore available were not wholly satisfactory from the standpoint of the continuity achievable between the joined elements in the resulting frame. The joining means have usually been required to include externally accessible parts engageable by fitters' tools, and the resulting assembly was not wholly reliable.

Moreover, conventional recessed sectional elements are not adapted for simply and efficiently supporting a large number of ancillary equipment and fittings. Furthermore they require the use of relatively complicated insulation to prevent undesirable thermal and electrical conductive paths from being set up. The invention has as its object to overcome these and other inconveniences encountered with existent recessed structural elements and joining members.

According to a feature of the improved structural element, the element includes at least one recessed or hollow core section which, at the same time as it imparts high rigidity to the element, serves to receive a leg of a complementarily shaped and serrated joining member fitted therein for assembly of said element with another element of similar recessed configuration. The hollow core section of the structural element has longitudinally extending webs and/or flanges projecting from it and serving among other purposes for the attachment and positioning of various types of equipment thereto after assembly, such as plastic slabs, etc.

Structural elements according to the invention can be quickly and cheaply assembled into strong yet simple frames provided inherently with the necessary means for securing them to external supporting structure as well as attaching various covering and other building requisites thereto.

In a preferred form, the improved structural element includes a hollow core section in the cross sectional form of an elongated diamond whose sharper apices are truncated by webs parallel to the shorter diagonal of the diamond; coplanar flanged side webs extend outwardly along the opposite sides of the core section from the ends of said shorter diagonal; further, from the sides of one of the truncating end webs of the core, there extend two diverging webs, provided with flanges at their free ends, and preferably defining between them the same angle as that between the two sides of the diamond adjacent to said truncating end web. In modified forms of the invention, a structural element of the type just defined may be assembled from a plurality of sub-elements which are made from similar or dissimilar materials.

The various features of the invention will stand out from the ensuing description of detailed embodiments of the invention with reference to the accompanying drawing, wherein:

FIG. 1 is a perspective view of a fragment of an improved structural element according to the invention;

FIG. 2 is a perspective view of a modified element, made up of a plurality of sub-elements;

FIG. 3 is a perspective view of part of a structural frame assembled from a plurality of elements according to the invention;

FIG. 4 is a perspective view of a joining member used in erecting a frame as in FIG. 3;

FIGS. 5 and 6 are cross sectional views of a frame of the general type shown in FIG. 3, and erected as flooring and as a wall structure (respectively) completed with slabs or panelling.

Referring especially to FIG. 1, a structural element according to the invention is there shown to comprise a recessed core section 1 defined by four main side faces 2a, 2b, 3a, 3b arranged in the general shape of a narrow elongated diamond. The sharper apices of the diamond are truncated by means of end webs 4 and 5 parallel to the smaller diagonal $a$–$b$ of the diamond section. In the plane of this smaller diagonal $a$–$b$ the element comprises two side webs 6a, 6b extending outwardly in opposite directions and having their free ends provided with perpendicular flanges 7a, 7b extending in opposite directions at right angles to said webs 6a, 6b. Each of the end flanges 7a, 7b, further has a flange or lip 8a, 8b extending at right angles from its lower edge towards the core section of the element. Moreover, short flanges 9a, 9b extend upwardly from, and at right angles to, the webs 6a, 6b at intermediate points thereof somewhat closer to the core section of the element than to the end flanges 7a, 7b, as shown in the drawings.

Extending from the upper end web 5 of the core section are two webs 10a, 10b, which diverge upwardly at substantially the same angle as that formed between the adjacent sides of the diamond, and about the same length. The upper ends of the webs 10a, 10b, are provided with flanges 11a, 11b parallel to the webs 6a, 6b and terminating in right-angled flanges 12a, 12b positioned correspondingly to, and extending towards, the intermediate flanges 9a, 9b on the webs 6a, 6b. Thus the web 5 with its diverging webs 10a, 10b constitutes a sort of channel section which is generally designated 13.

The structural element thus described can be made from any of various metals, and by any of various metal working techniques including rolling, extrusion and drawing. It may also be made of suitable plastic materials having oppropriate strength and resiliency.

FIG. 2 illustrates a recessed structural element according to a modification of the invention, the element being of a sectional shape generally similar to that shown in FIG. 1, but being a composite element made up from a plurality of sub-elements. Specifically, there is provided in this form of the invention a first sub-element 101 having a trapezoidal core section with oblique converging sides 102 and an integral interconnecting end web 104. The sides 102 at their free diverging ends are bent inward then outward to provide the inwardly projecting ribs 114, followed by coplanar outward flanges 106. These flanges are in turn bent at their outer ends upward and downward to provide the vertical flange portions 107, which at their lower ends are bent inwards to provide the terminal flanges 108.

Overlying the sub-element 101 is a second sub-element 113c which has a trapezoidal core section of a shape similar to that of the core section of sub-element 101, and symmetrically positioned with respect thereto, the said core section of sub-element 101 including the downwardly diverging sides 103c integrally interconnected at their upper ends by the end web 105c. The sides 103c at their diverging lower ends are bent inward then outward to provide the inturned ribs 115c, overlying the corresponding ribs 114 of sub-element 101, and the coplanar outward flanges 111c, overlying the flanges 106 of sub-element 101. The flanges 111c however are of shorter extent than the flanges 106 and are bent upwards at their outer ends to provide the intermediate upstanding flanges 112c.

A third sub-element 113d is positioned above sub-element 113c and is similar in cross sectional shape to that of the sub-element 113c and positioned in inverted relation with respect to it, with the end web 105d of sub-element 113d being in engagement with end web 105c of sub-element 113c. The parts of sub-element 113d are designated by the same references as the corresponding parts of sub-element 113c with the subscript *d* being substituted for *c*. The three sub-elements 101, 113c and 113d are assembled with one another in the relative position shown, through any suitable means not shown in FIG. 2, such as welding, bolts or other means. One desirable means of assembling the sub-elements to form the composite element of FIG. 2 will be described later.

It will be apparent that the resulting composite structural element, shown in FIG 2, is generally similar in cross sectional configuration to that of the integral element described with reference to FIG. 1, and it is noted that most of the component parts of the composite element (FIG 2) are designated by the same reference numbers as those designating the corresponding parts of the integral element (FIG. 1), plus one hundred. The sub-elements such as 101, 113c, 113d may be made from similar or dissimilar materials, including both metals and plastics, by various techniques such as extrusion, drawing, or shaping of strip materials in suitable roller-type strip forming apparatus. The sub-element may be separated by insulating seal strips, and one such strip is shown at 105e as interposed between the webs 105c and 105d; another such strip may be interposed between the flanges 106 and flanges 111c.

A recessed structural element of the general cross sectional configuration disclosed in accordance with this invention may be produced in yet other ways than as shown in FIGS. 1 and 2. Thus, the element may be composed of two sub-elements rather than three, with one sub-element constituting the flanged diamond-shaped section and the other sub-element the flanged V-shaped section earlier referred to. Such an element is illustrated by way of example in FIG. 3, now to be described; it being understood that the ensuing description of the structure shown in FIG. 3 would be applicable, mutatis mutandis, to cases where the two-part structural element there shown is replaced with the integral element of FIG. 1, or with the three-part element of FIG. 2.

FIG. 3 illustrates a corner portion of a structural frame assembled from two orthogonally-related structural elements of the invention. One of these elements is made up from the two sub-elements 116a and 117a, as just explained, and the other is made up similarly from the two sub-elements 116b and 117b. The adjoining ends of the two mutually-orthogonal elements are cut at 45° to provide a mitre-joint relationship between them. The two elements are then assembled with each other using a joining member 118 of the type shown in FIG 4. This joining member is generally L-shaped, and its two legs 119 and 120 are adapted for insertion into the recesses of the respective elements to be joined. Specifically, each of the legs 119 and 120 has one side portion, 119g and 120g respectively, which is partly trapezoidal in cross section complementary to the trapezoidal shape of the end part of the diamond-shaped section 116a or 116b of each structural element, and has its opposite side portion which is also part-trapezoidal for insertion into the trapezoidal section 117a or 117b of said elements. Further, each leg 119 and 120 has a slot 119h, 120h, formed in it for engagement around the transverse web portion (corresponding to web 5, FIG. 1) between the two sub-elements. The outer surfaces of the part-trapezoidal sections 119g, 120g, are serrated as at *g* to provide ratchet-like teeth inclined in a direction to oppose withdrawal of the related joining member leg from out of the element into which it is inserted, and the inner surfaces of the slots 119h, 120h are provided with similar ratchet-like serrations as shown at *h*. It will be understood that when the legs 119, 120 of the L-shaped joining member 118 are inserted into the adjoining ends of the recessed elements 116a, 117a and 116b, 117b respectively, in the directions indicated by the arrows *f1* in FIG 4 and as indicated in dotted lines in FIG. 3, the ratchet-like serrations *g* and *h* due to their asymmetrical formation resist withdrawal in the reverse directions.

It will be noted that the dimensions indicated as $l_1$ and $l_2$ in FIG. 4 should be somewhat shorter than, respectively, the spacing between the opposite webs (corresponding to webs 4 and 5, FIG. 1) on the diamond-shaped sub-elements 116a, 116b, and the spacing between the web (corresponding to web 105d, FIG. 2) and the end flanges (corresponding to 115d, FIG. 2) of the V-shaped sub-elements 117a, 117b.

In addition to the L-shaped joining members 118 (FIG. 4) used according to the invention for assembling together a pair of recessed structural elements in providing a corner of a structural frame of the type shown in FIG. 3, the invention contemplates the use of T-shaped, i.e. three-legged, joining members for assembling together three such elements to provide a border intersection in such a frame, and cross-shaped, i.e. four-legged joining members for assembling together four elements to provide an inner intersection of the frame. While such three and four-legged joining members have not been shown, their construction will be immediately apparent from the explanations given above for the two-legged joining member of FIG. 4.

Instead of or in addition to joining members of the type just described, joining members such as the one partly shown at 121 in FIG. 3, can be used to assemble the structural elements of the invention into a frame. The L-shaped joining member 121 has two legs each with a cross sectional contour presenting an inwardly directed broad apex complementary to the angle formed between mating webs such as 3b and 10b in FIG. 1. Thus each leg of member 121 can be inserted into the open recess E (FIG. 3) defined by the said adjacent side webs of a related structural element. A generally similar joining member may be designed according to the invention to fit into the open recesses, defined at the inner sides of the members, as at *e* (FIG. 3).

Joining members of somewhat similar character may be used according to the invention for assembling the sub-elements such as 101 and 113c, to form a composite structural element of the type shown in FIG. 2. Such a joining member would include a diamond-shaped core section, with side notches or grooves extending inward from the opposite broad apices of the diamond to receive therein the rib portions such as 114–115c (FIG. 2).

A frame of the general kind partly shown in FIG. 3 can constitute a wall frame of a building, and may equally well be used as a floor (or roof) frame. In either case the wall or floor frame would be completed by the provision of sheet, slab and/or panel elements in a manner now to be described with reference to FIGS. 5 and 6. In the ensuing description various parts of the structural elements shown in FIGS. 5 and 6 will be referred to by the same numerals as those designating corresponding parts in FIG. 1 or FIG. 2 with the letter subscripts being omitted wherever this can be done without introducing ambiguity.

FIG. 5 illustrates by way of example a frame of the general type shown in FIG. 3 and disposed to provide a flat roofing for a building. The frame shown on FIG. 5 is constituted by two mutually orthogonal structural elements of the same type as shown in FIG. 3, positioned in a horizontal plane, one of the elements being seen in transverse cross section, and being positioned inverted with respect to the position shown in FIG. 1 i.e. with its diamond-shaped core section uppermost. A roofing slab 122 has an edge part of it resting upon a flange 8 of the element by way of a suitable sealing strip 123 secured to said flange. An attaching clamp 124 projecting from the lower edge of slab 122 engages resiliently under the flange portion 7. Spaced below the roofing slab 122 is a ceiling slab 125, which has an edge of it resting upon the flange 12 of the structural element by way of a sealing strip 126 secured to said flange. Slab 125 is retained in position by means of an attaching clamp 127 secured to its upper edge surface and having an upper portion resiliently engaging under the flange 9 of the structural element. The roofing and ceiling slabs or panels 122 and 125 are preferably made partly or wholly from material having moisture, heat and sound proofing characteristics, and provide excellent insulation in conjunction with the sealing strips or beads 123 and 126.

FIG. 6 illustrates a frame of the general type shown in FIG. 3 which is disposed in a vertical plane to provide an outer or inner wall of a building. Shown attached to the upper side of the horizontally-disposed structural element are three horizontally spaced, vertical wall panels 127, 130 and 128. The outer panels 127 and 128 are attached by way of suitably shaped clamp members 127a and 128a respectively, to the flanges 11 and 7, respectively, of the structural element. The middle panel 130 is shown as having a suitably shaped bottom edge surface supported by means of an M-shaped clamp member 129 which has its upright legs formed with outturned flanges resiliently engaging, by way of sealing strips, in the recesses defined by the flanges 9 and 12 of the element. A sealing strip or bead 131 secured around the flange portion 7 of the element engages a side surface of the middle panel 130 to improve the sealing characteristics of the wall structure and/or the distribution of loads across the wall structure.

In FIG. 6, the wall structure below the structural element is shown by way of example as including only the two wall panels 132 and 133 respectively corresponding to the panels 130 and 128 described above, while the panel 127 is here omitted. The upper end of panel 132 is shown as being attached to the structural element by way of a suitably shaped resilient clamp member 134 having an end secured to the panel 132 and its other end resiliently engaging the flange portion 12 of the element. Panel 133 is shown as being attached by way of a hook-like element 135 engaging the flange portion 8 of the element. A sealing strip or bead 132a engaged around the flange portion 7 is pressed against a side of the panel 132.

From the exemplary uses just disclosed; it will be apparent that structural elements constructed according to the invention are extremely versatile and that the multi-flanged cross sectional configuration disclosed, while being relatively simple and providing a high degree of rigidity, at the same time serves a variety of useful purposes including especially the attachment of cover slabs and panels by way of suitable clamps, the provision of flexible strips and beads for sealing and stress-distributing purposes, and the like. The various fittings thus attached to the elements are easily and quickly mounted or removed, e.g. in temporary and/or transformable structures, without damage to any of the components.

The structural elements of the invention, while frequently constructed from metal are also capable of being made partly or in whole from suitable insulating materials, as earlier indicated, thereby avoiding the necessity of providing relatively expensive insulating arrangements which would otherwise in many cases be required to prevent the establishment of thermal and/or electric conduction paths, liable to result in distortion, corrosion and other inconveniences.

The sloping faces of the structural element, both in the diamond-shaped core section and the open V section of it, facilitate ventilation and the run-off of rain and condensation water, as indicated by the arrows in FIGS. 5 and 6 for which purposes holes may easily be formed at suitable spaced positions through the side walls of said sections, as indicated in said figures. The run-off water can then conveniently be made to drain off by way of the grooves provided by suitable ones of the various flange parts of the structural element (see for example the arrow $f2$ in FIG. 5), thereby making further drainage means unnecessary.

Various modifications in the shape of the improved structural element may be conceived without departing from the scope of the invention. Thus, as one example, the two flanges 11a and 11b in FIG. 1, or 111d in FIG. 2 may be extended towards each other and made continuous or integral, so that the open V section designated 13 (FIG. 1) or 113d (FIG. 2) would then be changed into a closed trapezoidal section.

Various specific uses of the improved element may likewise be devised in addition to those already mentioned. Thus, as shown in FIG. 5, a flange 12 may be used as a runway for a flanged pulley 136 from which a sliding door panel, or wall panel, may be suspended. Further, the element might be used as a banisters for a staircase, with part of the element serving as a handrail.

The improved structural element lends itself readily to various conventional uses and techniques that are standard in building work, such as prestressed girders and joists having high bending strength.

What I claim is:

1. A structural element comprising a pair of sub-elements each of trapezoidal cross sectional shape with an end web defining the smaller base of the trapezoid and symmetrically diverging side webs defining the sides of the trapezoid, inturned flange portions projecting from the free ends of the side webs of each sub-element, outturned flanges extending from the ends of the inturned flange portions of at least one of the sub-elements and projecting beyond the sides of said sub-element to provide coplanar lateral webs, and means joining both sub-elements with the larger bases of said trapezoids directed towards each other so that said inturned flange portions define internal ribs projecting toward each other, said joining means comprising a member insertable into the trapezoidal recesses of both sub-elements and having opposite side grooves engageable with said inturned ribs to retain the sub-elements in assembly.

2. The element defined in claim 1, wherein both sub-elements have outturned flanges extending from the ends of the inturned flange portions thereof, the outturned flanges of one of the sub-elements projecting beyond the sides of the sub-element a greater amount than the outturned flanges of the other sub-element, outer flanges formed at the outer ends of said outturned flanges of said one sub-element, and intermediate flanges formed at the outer ends of said outturned flanges of said other sub-element.

3. A structural element comprising a hollow core section in the general cross-sectional form of an elongated diamond having its sharper apices truncated to define end webs parallel to the shorter diagonal of the diamond, coplanar side webs extending outwardly along the opposite sides of said core section from the ends of said shorter diagonal, a pair of further webs extending along said core section in diverging relation from one of said end webs away from the adjacent sides of said diamond-shaped core section and in generally symmetrical relation therewith, coplanar flanges located along the ends of said further webs and directed parallel to said side webs, flanges extending along the outer ends of said side webs in planes parallel to the longer diagonal of said diamond and having rims projecting from corresponding edges thereof toward said core section, intermediate flanges projecting from intermediate points of said side webs toward said flanges at the ends of said further webs, and rims at the outer edges of said flanges on the ends of said further webs, said last mentioned rims being directed toward said intermediate flanges of the side webs and in common planes therewith.

4. A structural element comprising a hollow core section in the general cross-sectional form of an elongated diamond having its sharper apices truncated to define end webs parallel to the shorter diagonal of the diamond, coplanar side webs extending outwardly along the opposite sides of said core section from the ends of said shorter diagonal, a pair of further webs extending along said core section in diverging relation from one of said end webs away from the adjacent sides of said diamond-shaped core section and in generally symmetrical relationship therewith, and coplanar flanges located along the ends of said further webs and directed parallel to said side webs, and wherein said side webs are provided with flanges at their outer ends in planes parallel to the longer diagonal of said diamond, and intermediate flanges projecting from intermediate points of said side webs toward said flanges at the ends of said further webs.

5. A structural element comprising a hollow core section in the general cross-sectional form of an elongated diamond having its sharper apices truncated to define end webs parallel to the shorter diagonal of the diamond, coplanar side webs extending outwardly along the opposite sides of said core section from the ends of said shorter diagonal, a pair of further webs extending along said core section in diverging relation from one of said end webs away from the adjacent sides of said diamond-shaped core section and in generally symmetrical relationship therewith, and coplanar flanges located along the ends of said further webs and directed parallel to said side webs, and wherein said side webs have flanges along their outer ends extending in both directions parallel to the longer diagonal of the diamond, and rims projecting from corresponding edges of said flanges at the outer ends of said side webs toward said core section.

References Cited

UNITED STATES PATENTS 2,901,785   9/1959   Hinchliffe et al. _____ 52—475 X
3,038,568   6/1962   Morgan _____ 52—731 X

FOREIGN PATENTS 1,283,356   12/1961   France.

REINALDO P. MACHADO *Primary Examiner.*

HARRISON R. MOSELEY, *Examiner.*

J. K. BELL, *Assistant Examiner.*